Nov. 18, 1924.

J. HOPKINSON

COUNTING SCALE

Filed Nov. 20, 1920

INVENTOR
Joseph Hopkinson
BY
Kerr, Page, Cooper + Hayward
ATTORNEYS

Nov. 18, 1924.
J. HOPKINSON
1,516,013
COUNTING SCALE
Filed Nov. 20, 1920  3 Sheets-Sheet 2
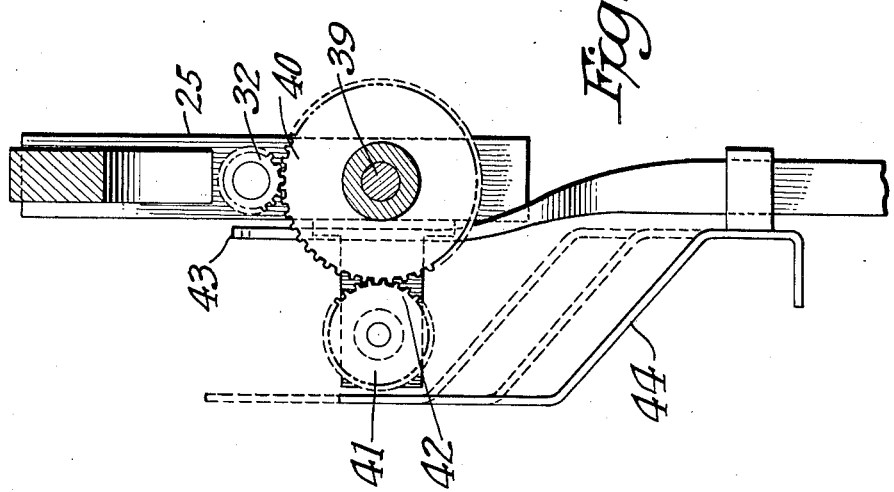
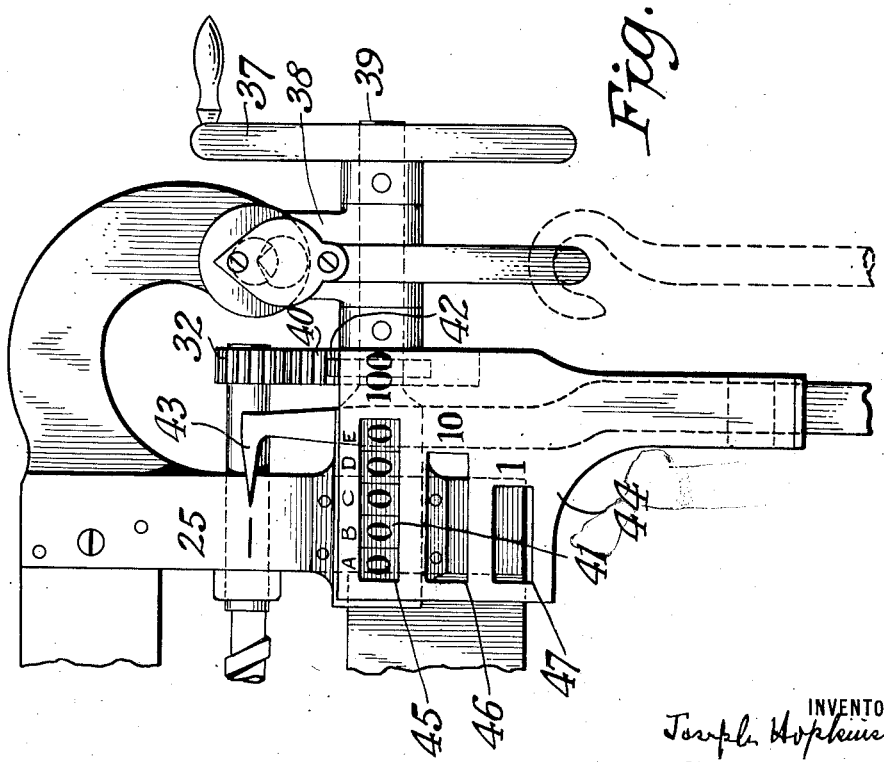
INVENTOR
Joseph Hopkinson
BY
Kerr, Page, Cooper & Hayward
ATTORNEYS Nov. 18, 1924.

J. HOPKINSON 1,516,013

COUNTING SCALE

Filed Nov. 20, 1920

INVENTOR
Joseph Hopkinson
BY
Kerr, Page, Cooper & Hayward
ATTORNEYS

Patented Nov. 18, 1924.

1,516,013

UNITED STATES PATENT OFFICE.

JOSEPH HOPKINSON, OF DAYTON, OHIO, ASSIGNOR, BY MESNE ASSIGNMENTS, TO DAYTON SCALE COMPANY, OF DAYTON, OHIO, A CORPORATION OF NEW JERSEY.

COUNTING SCALE.

Application filed November 20, 1920. Serial No. 425,324.

*To all whom it may concern:*

Be it known that I, JOSEPH HOPKINSON, a citizen of the United States of America, residing at Dayton, in the county of Montgomery and State of Ohio, have invented certain new and useful Improvements in Counting Scales, of which the following is a full, clear, and exact description.

This invention relates to improvements in counting scales of the type shown and described in Hopkinson Patent No. 1,110,262. In the use of the counting scale shown in the patent above mentioned count readings are taken from a beam graduated with a plurality of graduations. While satisfactory results are usually secured with this method of reading if proper care is taken, it has been found objectionable in some instances. If the aggregate count of the articles weighed is large it becomes necessary to space the graduations upon the beam very closely together or to excessively lengthen the beam. Either practice is open to objection, the fine graduations being difficult to read and interpolate properly and the lengthing of beams being objectionable on account of the increase in over-all width of the scale.

The present invention has for its objects the provision of a count displaying device or unit of such character that fine graduations are avoided and at the same time the scale beams may be kept within desired dimensions. The capacity may also be materially increased over present constructions.

Other objects reside in the provision of a count displaying device which will permit numerical readings to be taken without the possible confusion arising from taking readings from a graduated scale having a variable numerical value.

A further object of the present invention resides in the provision of a so-called direct reading device which may be readily attached to scales of the type shown in the Hopkinson patent heretofore referred to.

Other objects reside in the provision of a device which will be simple to use and manufacture and one which will not get out of order when in use.

In the drawings:

Fig. 2 shows an enlarged view of certain of the count indicating devices.

Fig. 3 shows an end sectional view of certain of the parts shown in Fig. 2.

Figure 1:
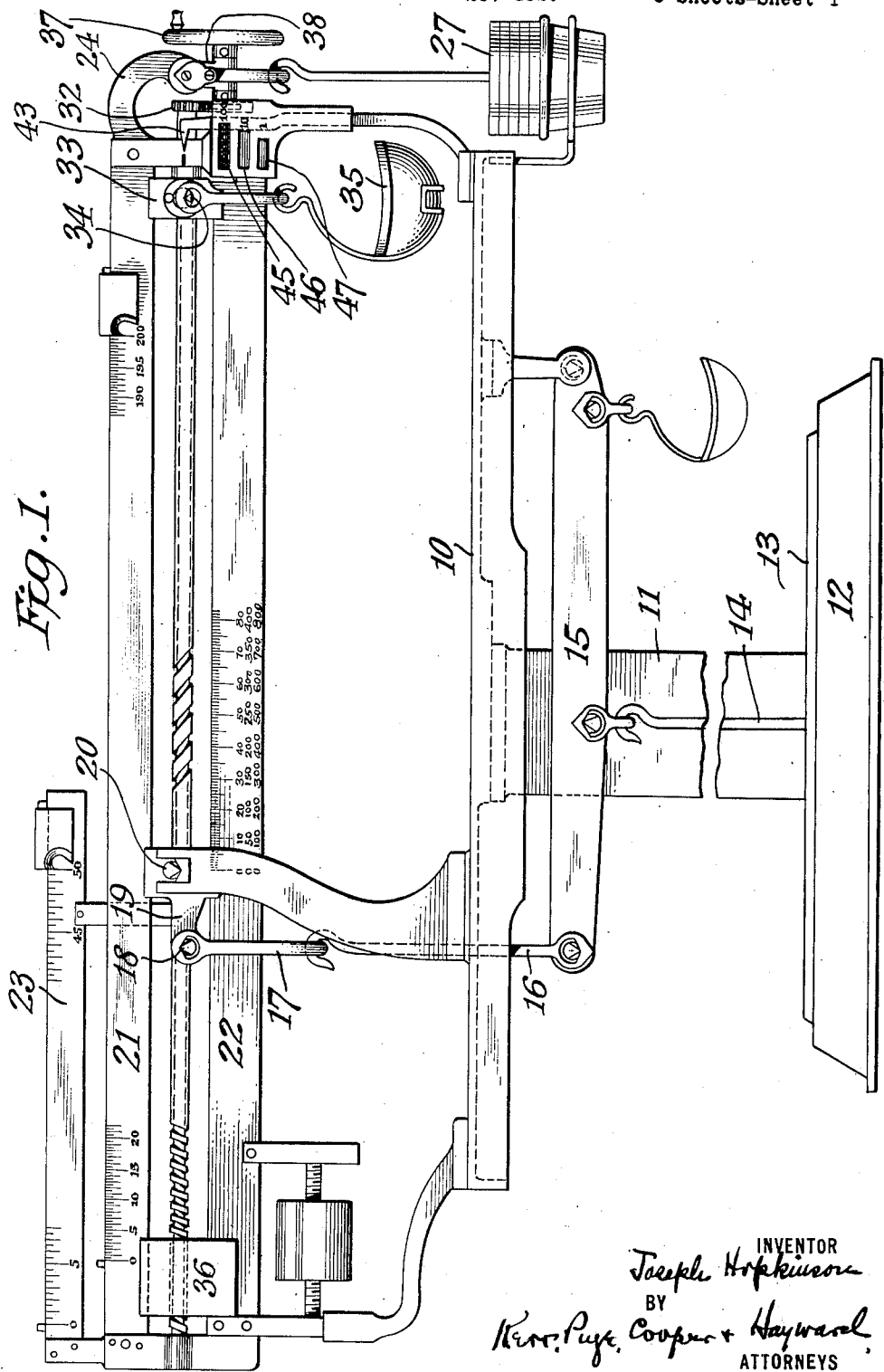
Figure 1 is an elevation of a weighing machine embodying the present improvement.

As shown in the accompanying drawings the machine embodies a head 10 supported upon a standard 11 from a base 12. Upon the base there is supported, through the usual base lever system a platform 13 and extending upwardly from the base lever system is a steelyard 14 which connects with an intermediate lever 15 suspended at one end from the head 10 and at the other end connected through link 16 and loop 17 with knife edges 18 carried by a beam yoke 19. The beam yoke is also provided with knife edges 20 which rest in bearings carried in brackets extending upwardly from head 10. The scale beam which is rigid with yoke 19 includes top and bottom bars 21 and 22 and tare bar 23. Bars 21 and 22 extend in opposite directions from the fulcrum knife edges 20 and at their ends are connected by pieces 24 and 25. 25 has fastened to it a goose neck 26 from which the counterpoise cup 27 is suspended in the usual manner.

The bar 21 is graduated in the usual manner with pound and ounce graduations and is provided with a sliding poise 28. The tare beam 23 is likewise provided with a poise and the beam assembly is likewise provided with a balance weight 30.

Journaled in the beam, preferably between the upper and lower bars 21, 22 is a screw-threaded shaft 31 having one end extended beyond part 25 and provided with a pinion 32. The ends of the shaft 31 upon opposite sides of the beam fulcrum are provided with screw-threads of opposite inclination. The threads to the right as shown in Fig. 1 are preferably provided with a long pitch and those to the left with a short pitch.

Cooperating with the threaded shaft to the right of the fulcrum is a carriage 33 provided with knife edges 34 from which is suspended a counterweight receiver 35. The threaded shaft to the left of the beam fulcrum carries a poise 36 which is adapted to move to the left as the counterweight receiver moves to the right, and counterbalance the weight of the same when empty. These movements are effected by rotating the shaft in a manner to be hereafter described. The counterweight receiver being in itself counterbalanced irrespective of position, the weight of articles therein will alone load the beam and may be used to counterbalance the load upon the platform 13. With the load thus counterbalanced the displacement of the carriage and counterweight receiver may be used as a measure of the count of articles upon the platform if the leverage ratio of the machine and the number of articles in the receiver are taken into consideration. It therefore follows that if the rotational movement of the threaded shaft be counted, and due allowance be made for the leverage ratio and the number of articles in the receiver, the revolution count will correspond to the count of the articles upon the platform.

In order to rotate the threaded shaft I provide a hand wheel 37 fixed to a stub shaft suitably journaled in an extension 38 from goose neck 26. The stub shaft 39 carries a pinion 40 which meshes with pinion 32 and thereby rotates the threaded shaft upon rotation of the hand wheel.

Carried by a bracket attached to the part 25 is a counter 41. This counter is provided with a series of wheels A, B, C, D, E, from left to right. In the preferred embodiment wheels D and E do not turn but stand to display zero at all times. The other counter wheels operate in the conventional step-by-step manner with a tens transfer. This part of the counter is substantially like the well known Veeder counter. The rotatable wheels of the counter are driven from a pinion 42 which meshes with gear 39 (see Fig. 3). A convenient gear ratio is one which will turn wheel C one-tenth revolution for each graduation on beam 21. This wheel would therefore make twenty complete revolutions for the full travel of the carriage and receiver along the beam.

It will be understood that the gearing ratio takes into account the fixed leverage ratio of the machine. If there are 100 articles in the weight receiver 35, the direct counter reading of which A, B, C, D and E, taken when the beam is in balance as shown by pointer 43, will show the count of the articles upon the main platform.

In order to take into account the variation in numbers of articles in the receiver I provide a simple means for changing the reading status of the counter without changing the driving ratio therefor. The means for accomplishing this result comprises an adjustable shield 44 slidably mounted upon the bracket which carries pointer 43. This shield is provided with a number of window apertures 45, 46 and 47. With window 46 before the counter wheels the wheel E is obscured and the counter reading will show the count with 10 articles in the receiver. With window 47 aligned with the counter wheels E and D will be obscured and the reading will show the count with one article in the receiver.

The shield is preferably marked with appropriate figures showing the number of articles to be placed in the receiver when each particular window is adjusted to position in front of the counter.

While I have herein shown a preferred form in which the count is taken to the nearest 10, which is generally satisfactory, it is obvious that the count may be taken to the smaller units by providing intermediate markings upon the wheel C, which will be of proper size to receive the same.

Generally it is the practice to count even tens or hundreds and for this reason the unit count is not generally necessary.

It will be observed that in the construction shown the window value multiple and the counter multiple from wheel to wheel correspond.

Figures 4, 5:
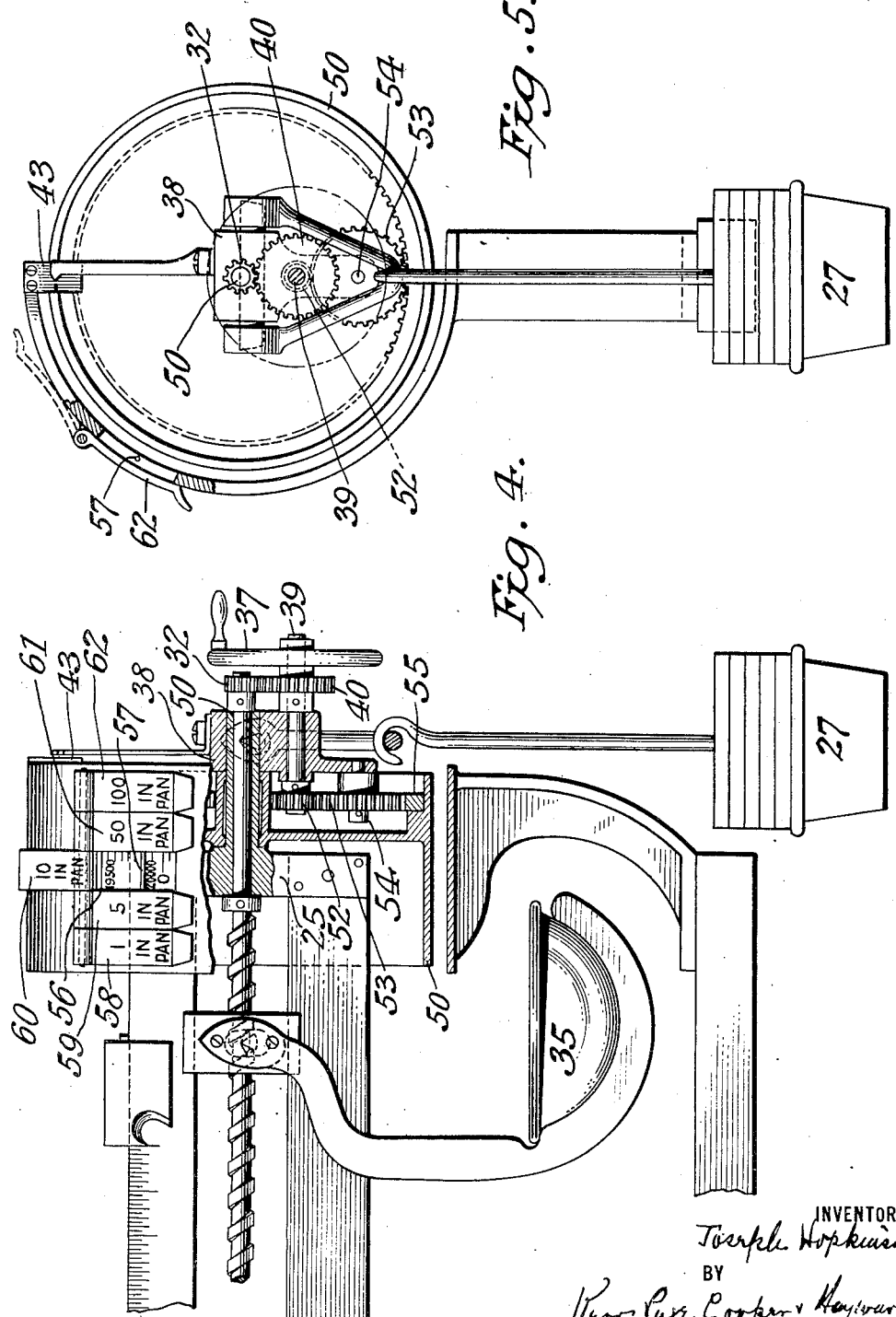
Fig. 4 is a view of a modified type of count indicating device.
Fig. 5 is an end sectional view of certain parts shown in Fig. 4.

Figs. 4 and 5 show a modified form of count indicating device. In these figures the goose neck 26 is omitted and part 25 is provided with an annular extended boss 50. Rotatably mounted upon this boss is a drum 51 and part 38 is fastened upon the end thereof. From this part 38 the weight cup 27 is suspended in the usual manner. Drive to the screw shaft is effected through hand wheel 37, shaft 39, and gears 40 and 32. Upon the end of the shaft 39 is a gear 52 which meshes with an intermediate gear 53 carried on a shaft 54 suitably supported in part 38. The intermediate gear 53 drives an internal gear 55 which is fixed to the interior of the drum 51. The drum is graduated upon its periphery with a plurality of rows of graduations corresponding to the different counts for varying drum displacements and for various numbers of articles in the counterbalancing receiver. One of these rows of graduations is visible at 56 in Fig. 4.

In order to facilitate the count reading and to provide means for preventing the readings of counts on adjacent scales I provide the drum 51 with a hood 56ᵃ which is provided with a number of windows each covered by a hinged shutter. A suitable cross reading wire 57 is also provided, this wire being fixed in the drum housing. These shutters 58, 59, 60, 61 and 62 are provided with indicating characters both on inner and outer sides which designate the number of articles to be placed in the pan when the count is read through a particular window opening.

In practice the operator would probably place 1, 5, 10, 50 or 100 articles in the pan, depending upon the number needed to counterbalance the load. Thereafter he would open the window marked for that particular number of articles and close the remaining windows. After bringing the scale to balance as shown by the pointer 43, the count reading would be taken by reading the intersection of the cross wire and the selected graduated scale.

The drum construction may be extended to include an additional number of graduated scales and by providing the proper size drum the length of the graduated scale may be considerably extended. The cross wire is close to the indicating drum, thereby obviating possible errors in reading which would occur with a graduated scale disposed remote from the number scale.

I claim:—

1. A count indicating attachment for a counting weighing scale having an article receiver displacing element and a means for operating the same to counterbalance the load, said count indicating device comprising in combination a rotary indicating device operated in unison with the aforesaid displacing element, to indicate the count corresponding to a given displacement of said element, and means for selectively rendering different portions of said indicating device visible corresponding with a number of articles carried by the receiver.

2. A count indicating attachment for a counting scale including an article receiver displacing element and means for operating the same, said attachment comprising in combination with the aforesaid elements of the counting scale, a count displaying device operated in unison with the aforesaid displacing element and means associated therewith for selectively obscuring certain portions of the count displaying device and for concurrently displaying other portions thereof to the operator.

3. A count indicating attachment for a counting scale, said scale having an article receiver displacing element and means for operating the same, said attachment comprising in combination with the aforesaid parts of the counting scale a rotary indicating device, gearing connections intermediate said device and the article displacing element for operating the said indicating device in unison with and proportionally to the displacement of the article receiver, said indicating device having a plurality of number scales corresponding with varying numbers of articles in the receiver, and means for selectively rendering one or another of scales visible to the operator.

4. The invention set forth in claim 3 in which a registering counter is provided for indicating the count.

5. A counting indicating attachment for a counting scale, said scale including a counting beam, a counterbalance article receiver shiftable thereon and a displacing element therefor carried by the beam, a rotary multiple wheel count indicator carried by the beam, and gearing for driving the same in unison with the shifting of the article receiver by its displacing element.

6. A count indicating attachment for a counting scale, said scale including a counting beam, a counterbalanced article receiver shiftable thereon, and a displacing element therefor carried by said beam in combination with a rotary count indicator composed of counter having a plurality of wheels, gearing for driving the same in unison with the shifting of the article receiver by the displacing element, and a slide having a plurality of window openings therein disposed in front of said counter wheels, said slide being adjustable relatively to the wheels to obscure one or more of the said wheels for the purpose described.

7. The invention set forth in claim 6 in which the slide is provided with indicating numerals adjacent the windows to indicate the number of articles to be placed in the article receiver when the count is read through a particular window.

8. The invention set forth in claim 2 in which the obscuring means is provided with indicating characters to designate the number of articles to be placed in the article receiver to counterbalance the load when a particular portion of the count displaying device is visible and being utilized by the operator.

In testimony whereof I hereto affix my signature.

JOSEPH HOPKINSON.